TYPE "A" SYSTEM
TYPICAL TRACTOR
(TRAILER CONTROLS
NOT SHOWN)

Fig. 1

TYPE "B" SYSTEM
TYPICAL TRACTOR
(TRAILER CONTROLS
NOT SHOWN)

Fig. 2

INVENTORS.
FORREST O. E. SCHULTZ
BY ERROL W. KEITH

ATTORNEYS

United States Patent Office 3,330,604
Patented July 11, 1967

3,330,604
LOAD PROPORTIONING VALVE AND VEHICLE
BRAKE SYSTEM
Forrest O. E. Schultz and Errol W. Keith, Owosso, Mich., assignors to Midland-Ross Corporation, Cleveland, Ohio, a corporation of Ohio
Filed Jan. 11, 1965, Ser. No. 424,683
7 Claims. (Cl. 303—22)

This invention relates to fluid-actuated brakes. More particularly this invention relates to pneumatic brakes for automotive vehicles capable of carrying varying commercial loads, such as trucks, buses and the like. Still more particularly this invention relates to load-proportioned brake systems, such as air brakes for vehicles of the types indicated.

In a further particular aspect, the invention relates to a novel pressure-proportioning valve and valve actuating system, that is effective to relate the amount of braking force applied to the wheel of a load-carrying axle, to the instant loading of the axle carrying the wheel.

THE PROBLEM

The brakes on commercial vehicles such as trucks, buses and the like, equipped with conventional air brake systems are generally considered to be in balance whenever a fully loaded vehicle can be brought to a safe stop without wheel skid under prescribed conditions. The prescribed conditions include a dry, smooth, concrete surface with the vehicle being decelerated at a rate of 14 ft./sec./sec.

This conventional brake balance protects against loss of vehicle control as by skidding only under situations where the vehicle is fully loaded. It does not protect against loss of control when the vehicle is only partially loaded or unloaded.

In the partially loaded and unloaded conditions, the braking force is so high, that wheel skid, axle bounce, loss of control, and pavement damage often result.

This can be visualized as follows: The brakes of a truck are designed to stop a twenty (20) ton load at 14 ft./sec./sec. on dry pavement. This is a very powerful braking force. Now consider what happens when this high level braking effort is applied to an unloaded vehicle on a slick surface such as wet black-top pavement. Any excessive brake application easily causes the wheels to lock and skid, throwing the vehicle out of control. This last statement, of course, is to be tempered by considering the skill of the operator of the vehicle under such conditions. However, even with a skilled operator, this is more often than not the result which arises from fast brake applications under emergency conditions, such as panic stops and the like.

Further, and more particularly, consider a multi-axle vehicle, such as a truck tractor and a semi-trailer, on which the middle axle is heavily laden, the front axle is perhaps one-half laden, and the rear axle has practically no load. No amount of operator skill can apply brakes to this rig at a greater force than can be tolerated by the rear or lightly laden axle, else the wheels on that axle will lock.

Broadly speaking, if brakes are in balance or equally applied with respect to maximum rated loading, then any uneven loading as between axles will limit the effectiveness of the whole system to the braking ability of the axle having the least loading.

THE CHALLENGE

A more desirable standard of performance for air braked vehicles would include the ability of the vehicle to stop smoothly under any condition of rated loading for the vehicle and at any legal speed at a deceleration rate of 14 ft./sec./sec.—without wheel lock on any axle.

Therefore, a substantially contribution to the art would be provided by a fluid actuated brake system wherein means is provided for automatically proportioning the brake effort at each axle to the specific load on each axle; and which means will not interfere with or effect in any way the balanced operation of the service brake system on a fully laden vehicle, but which will compensate for any basic system imbalance deficiencies and yield static brake balance when the vehicle is operated unladen.

OBJECTS

It is therefore an important object of the present invention to provide a fluid-actuated braking system wherein the brake effort at each axle is proportioned to the load of that axle, on a continuous basis between and including the extremes of fully laden and completely unladen conditions.

A further object of the invention is to provide a novel proportioning valve that can be incorporated into a standard braking system, without modification thereof, to proportion the braking effort to the axle load of the vehicle.

A further object is to provide a novel pressure proportioning valve and an associated sensing mechanism whereby axle loading is transmitted to the valve to establish load-proportioned braking effort in the system, but wherein axle vibrations are damped out so that false signals are not put into the system as distortion factors.

A further object is to provide a novel brake effect proportioning valve system that is equally adapted to use with vehicles utilizing either mechanical or fluid spring suspension systems.

A further object is to provide a brake effect proportioning valve system that is capable of ignoring sudden variations in applied axle loading due to road irregularities, but will at the same time recognize a shift or actual change in loading.

A further object is to provide a pneumatically-actuated brake system for vehicles of the automotive type, including a balancing valve which automatically proportions brake effort to axle load without interfering in any way with the operation of the service brake system on a fully laden vehicle.

A further object is to provide a pneumatically-actuated braking system wherein compensation is made for any basic system imbalance deficiencies to yield a static brake balance when the vehicle is operated unladen.

A further object is to provide a vehicle brake system wherein foot pressure required to activate the brakes will be a fixed value for any specific rate of deceleration regardless of the vehicle weight within the rated limits of the vehicle.

A further object is to provide a balanced braking system wherein the balance can be directed to specific axle or axles of a multi-axle vehicle.

Other objects of this invention will appear in the following description and appended claims, reference being had to the accompanying drawings forming a part of this specification wherein like reference characters designate corresponding parts in the several views.

Before explaining the present invention in detail it is to be understood that the invention is not limited in its application to the particular construction and arrangement of parts illustrated in the accompanying drawings, since the invention is capable of other embodiments and of being practiced and carried on in various ways. Also, it is to be understood that the phraseology or terminology employed herein is for the purpose of description and not of limitation.

THE INVENTION: PERSPECTIVE VIEW

The automatic brake proportioning valve mechanism of the present invention consists of a master control unit, and an actuating machanism that senses axle loading. The actuating mechanism exists in two embodiments: one for mechanical springs; and another for pneumatic springs.

The master unit consists in its principal elements of a valve for controlling air flow, two diaphragm-sealed pressure-responsive pistons, an adjustable fulcrum point, and mechanism for adjustably positioning the fulcrum point. The diaphragm-sealed, pressure-responsive pistons are responsible for the extremely low hysteresis characteristics of the valve of the present invention; and a damped fulcrum positioning mechanism insures long service life of the unit.

To this basic unit there can be applied, as desired, either a mechanical linkage—lost motion mechanism for cooperation with a mechanical spring suspension device on a vehicle; or a fluid pressure sensing unit—lost motion mechanism to establish control of the fulcrum point, based on developed pressure in a pneumatic spring suspension unit, such as one operating on the air bag principle.

Figure 1:
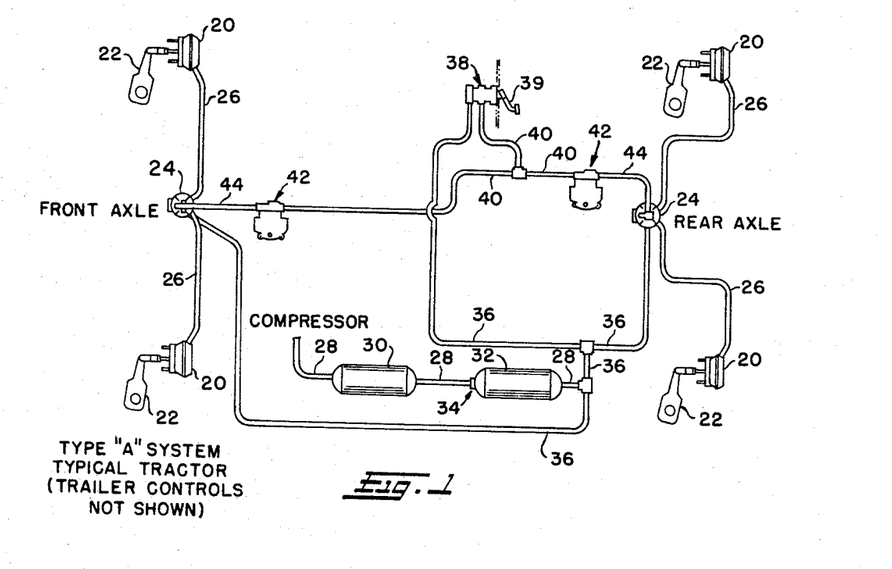
FIGURE 1 is a schematic view, for environmental illustration, of a typical truck tractor brake system, wherein two load-proportioning valves of the present invention function to provide load-proportioned braking for both the rear and front wheels of the tractor; and wherein the foot pressure required to activate the vehicle air brakes will be a fixed value for any specific rate of deceleration, regardless of individual axle loading.
Figure 2:
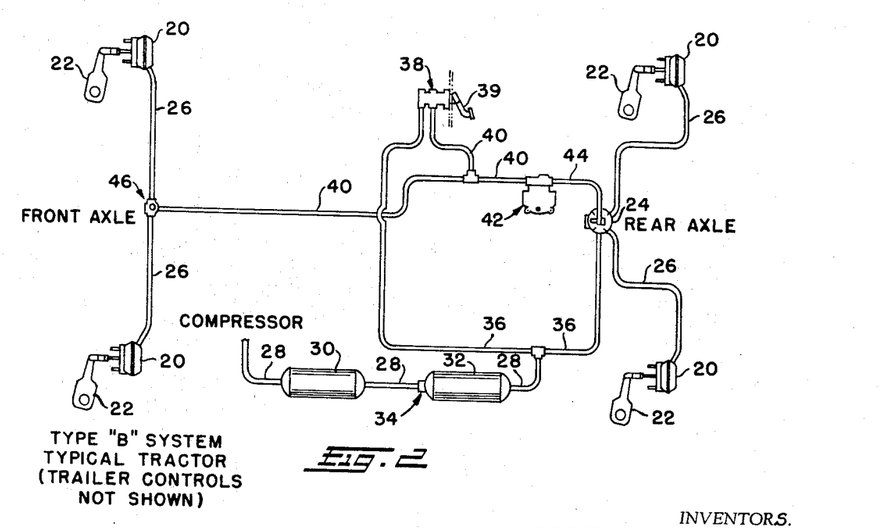
FIGURE 2 is a schematic view, for environmental illustration of a typical truck tractor brake system, wherein a pressure-proportioning valve of the present invention functions to monitor the rear axle only; and wherein the foot pressure required to activate the vehicle air brakes will vary directly with the load on the front axle of the vehicle for any specific rate of deceleration.

THE ENVIRONMENT: FIGURES 1 AND 2

The environment for the present invention comprises an air brake system for a commercial truck or the like. These vehicles are characterized by the fact that different amounts of lading are placed on an axle; and that a load can shift relative to an axle on rapid deceleration.

Two environmental systems are shown in FIGURES 1 and 2 of the drawings, as including an air-compressor, air reservoirs, piping, control valves, and the like, with air cylinders at each wheel to actuate the friction brakes for each wheel.

To simplify the discussion, highlight the important features, and illustrate the flexibility of the invention, FIGURES 1 and 2 show two different, but typical tractor systems. However, it is to be understood that the extended scope of the invention includes load-carrying trailers as well as tractors. Also, straight rigs such as buses are to be included within the scope of invention.

*Figure 1: Type "A" system—typical tractor (trailer controls not shown)*

In this system, automatic brake proportioning valves 42 of the present invention are used to monitor both the rear and front axles. In this system, load-proportioned braking is therefore provided for both the front and rear wheels of the tractor. Also, in this system, the foot pressure required to activate the vehicle air brakes will be a fixed value for any specific rate of deceleration regardless of the loading on the axles of the vehicle.

As shown in FIGURE 1, there is a brake actuating cylinder assembly 20 at each wheel position. The cylinder assemblies 20 include connecting links 22 that transform the linear motion of the cylinders 20 into rotary motion for moving brake actuating shafts, not shown.

The cylinders and links 20, 22 are provided with actuating compressed air from relay valves 24. Conduits 26 interconnect the relay valves 24 and cylinders 20.

Primary air is furnished to the system by a compressor, indicated by the legend "compressor." The compressor pumps air through a conduit 28 to a surge tank 30 and thence via a continuation of conduit 28 to a storage tank 32. A check valve, indicated systematically by the reference numeral 34, is provided at the inlet end of storage tank 32 to permit air to enter, and be held against reverse flow.

From the outlet end of the storage tank 32, air flows via a continuation of conduit 28 to a branched conduit 36 that leads to each of the relay valves 24 and to foot brake valve 38.

The brake valve 38 releases primary air via branched conduit 40 to each of the automatic brake proportioning valves 42 of invention. Connecting conduits 44 lead from the automatic brake proportioning valves 42 to the relay valves 24, thus completing the circuit.

*Operation of FIGURE 1*

In the functioning of the system of FIGURE 1, primary air is supplied at a given pressure level, for example, 100 p.s.i. This level will provide a safety margin over a brake chamber rated operating pressure of 80 p.s.i. The latter is established by S.A.E. standards for sound braking systems for brakes on each axle capable of developing a retarding force of .6 plus or minus 10% of the vehicle axle rating at a brake chamber pressure of 80 p.s.i.

The primary air flows to the foot brake valve 38 and is always there in readiness for release into the braking system. Upon actuation of the brake foot pedal 39 air flows to each of the automatic proportioning valves 42, which have been set in accordance with the loadings on the front and rear axles by sensing mechanisms to be described hereinafter. Proportional air then flows to the relay valves 24, which in turn release air at a "proportioned" pressure level, as determined by the valves 42, to the brake cylinders 20.

It is to be reiterated, that in this system wherein each axle has air braking effect proportioned to the axle loading, the foot pressure required to actuate the vehicle air brakes will always be a fixed value for any specific rate of deceleration regardless of the loading on the axle of the vehicle.

This is distinguishable from the type "B" system now to be discussed wherein brake pedal pressure is related to loading on an unmonitored axle.

*FIGURE 2: Type "B" system—typical tractor (trailer controls not shown)*

In this system, brake actuating cylinders and links 20, 22 are used at each wheel position, as before. However, the secondary air only flows to the cylinders of the rear or monitored axle via a relay valve 24. Secondary air does not flow to the front axle. Instead, primary air flows directly to the front axle, through a quick release valve 46.

Thus, a distinction arises from the system previously described.

The primary air is provided by a "compressor," conduit 28, surge chamber 30, storage tank 32, 34, and conduit 36. In distinction from the prior system, the conduit 36 leads only to the relay valve 24 of the monitored rear axle, and to the brake valve 38.

The brake valve 38 releases the primary air through branched conduit 40 to the automatic brake proportioning valve 42 that monitors the rear axle; and to the quick release valve of 46 of the front axle.

At the rear axle, connecting conduit 44 leads from the automatic proportioning valve 42 to relay valve 24, thus completing the circuit at the rear axle. Conduits 26 complete the circuit at the front axle.

*Operation*

In the operation of the system of FIGURE 2, primary air is supplied at a given pressure level—e.g. 100 p.s.i., to brake valve 38. Upon actuation of pedal 39, air flows directly to the front cylinders 20 through the quick release valve 46. This valve permits substantially instant bleed to atmosphere to empty the front cylinders 20 when the brakes are released.

Primary air is also released by the brake valve 38 and flows to the automatic proportioning valve 42 which is set in accordance with the loading on the rear axle (by interconnecting sensing mechanism to be later described).

Proportioned secondary air thus flows from the automatic proportioning valve 42 to the rear relay valve 24, that in turn releases proportioned air to the rear wheel cylinders 20.

The fact that the maximum retarding force permissible at the front axle varies in accordance with the load causes the foot pressure required to actuate the vehicle air brakes to vary directly with the load on the front axle for any specific rate of deceleration.

It is to be noted however that the amount of braking applied to the rear axle brakes is always proportioned to the load on the rear axle because of the presence of the automatic brake balancing valve 42 in the system serving the rear axle.

In view of the foregoing environmental introduction to the present invention, a completely detailed description of the invention will now be provided.

THE INVENTION.—THE AUTOMATIC LOAD PROPORTIONING VALVE

Figure 3:
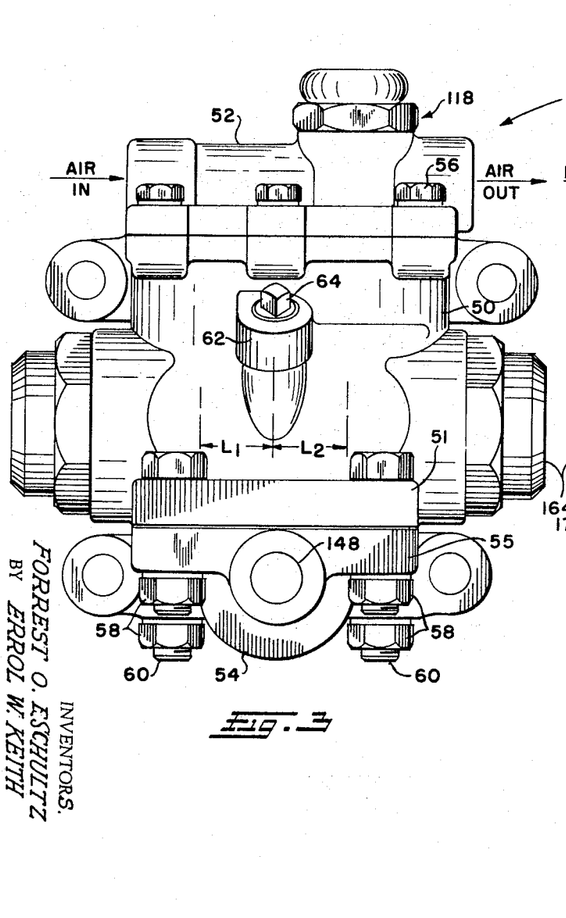
FIGURE 3 is a side elevational view of a basic load proportioning valve unit made in accordance with the present invention.
Figure 4:
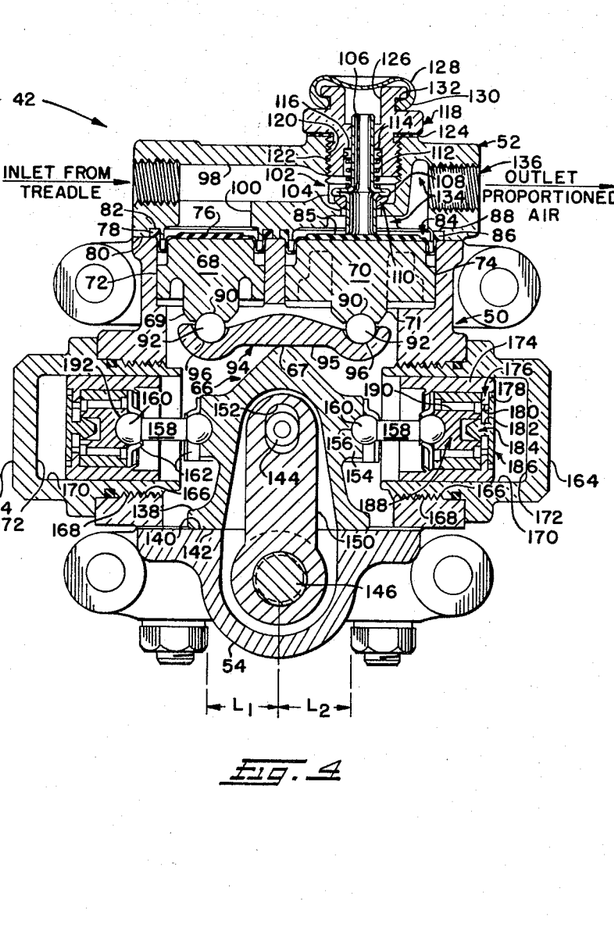
FIGURE 4 is a vertical sectional view through the unit of FIGURE 3.

The fully automatic pressure proportioning valve of the present invention is illustrated in FIGURES 3 and 4, where it is designated generally by the reference numeral 42. The valve 42 of the present invention will sense a change in axle loading and proportion the applied treadle air pressure, see element 39 in FIGURRES 1 and 2, to a given axle relay valve, 24, and brake chambers 20, yielding the most effective braking.

This valve assembly 42 is capable of ignoring sudden variations in applied loadings due to road roughness, but will nevertheless recognize a shift or actual change in load.

*The housing*

FIGURES 3 and 4 show that the automatic pressure-proportioning valve 42 is contained within a housing made of three sections. Thus there is a central casting 50, an upper cap unit 52, and a lower cover 54.

The upper cap 52 is held in place by machine bolts 56. The lower cover 54 is held to the central casting 50 by means of nuts 58 on bolts 60 that pass through flanges 51 and 55 on central casting 50 and lower cover 54, respectively.

A fluid filler opening 62 is provided as a boss on the side of casting 50; and is sealed with a screw plug 64.

*The fulcrum control; Load proportioning mechanism*

The upper half of FIGURE 4 shows the load proportion mechanism which utilizes a movable fulcrum 66 to establish a balancing relationship between two diaphragm sealed pistons, namely a control piston 68 and a proportioning piston 70.

The control piston 68 is reciprocable within a bore 72 and the proportioning piston 70 is reciprocable within a bore 74.

The control piston 68 is sealed across the top by a flexible diaphragm 76 of elastomeric material, such as rubber. The diaphragm 76 includes an exterior ring 78 that is clamped to the flat head surface 80 of the central casting 50, by a receiving groove 82 in the upper cap unit 52.

Similarly, the proportioning piston 70 is sealed across the top by a flexible diaphragm 84. A ring edge 86 of diaphragm 84 is clamped in a groove 88 in upper cap unit 52 to provide the seal, and permit free movement of the proportioning piston 70.

The diaphragms 76 and 84 are suitably cemented to the top surfaces of the respective pistons 68 and 70 to avoid shifting and prolong life.

It will be noted that rolling diaphragms are used in the present invention. These provide longer life than flat diaphragms. However, the invention is not to be limited to rolling diaphragms inasmuch as flat diaphragms have been proven successful at least to a degree.

Control piston 68 and proportioning piston 70 are each provided with lands 69 and 71 that extend coaxially downwardly beyond the bottom of the outer skirts. These lands 69 and 71 each terminate in half sockets 90 to receive pivot balls 92.

A balance arm 94 is provided beneath the pistons 68 and 70, of a length to span the distance between the axes of the pistons. At the ends, the balance arm 94 is also provided with half sockets 96 to complement the upper half sockets 90 and cradle the pivot balls 92.

The movable fulcrum 66 has an apex point 67 that engages flat bottom surface 95 of balance arm 94. The position of the apex 67 along the flat bottom surface 95 establishes the lever arms for pistons 68 and 70 respectively.

The manner in which the movable fulcrum 66 is set and the manner in which extraneous signals are damped out of the system will be discussed hereinafter.

First, however, the remaining components of the automatic load proportioning mechanism and the function of that mechanism will be set forth.

*Air inlet from treadle*

An inlet passage 98 is provided on the left hand side of the upper cap unit 52, as shown in FIGURE 4. A branch passage 100 opens from the passage 98 into the bore 72, receiving piston 68, to apply pressure to the top of diaphragm 76 and thus the top of the control piston 68.

At its right hand end, the inlet passage 98 opens into a poppet valve chamber 102. At the bottom, the poppet valve chamber 102 is provided with a circular opening 104, forming a passage for admitting treadle air, to be proportioned into the system, a chamber for the poppet valve 106 itself, and a valve seat against which the poppet valve 106 operates.

The poppet valve

The poppet valve 106 is of tubular construction and at a median point between its ends is provided with an annular flange 108 that performs two functions. On the bottom side, the flange 108 supports an elastomeric annular valve element 110. The valve element 110 is adapted to close against the periphery of opening 104 and control flow of primary treadle air from inlet passage 98 into the system.

Above the flange 108 of valve 106, there is provided a compression spring 112 that is retained at its upper end against a packing gland 114 that in turn is retained against a shoulder 116 of a tubular cap nut 118. The spring 112 biases the poppet valve 106 toward a closed position. The poppet valve 106 is opened by the proportioning piston 70 engaging the lower end.

The tubular cap nut 118 is threaded 120 on the outer periphery and is run into a threaded bore 122 of the upper cap casting 52. A gasket 124 provides a seal against loss of compressed air from the system.

Over the top of the cap nut 118, and covering the central stepped bore 126, is a dust-protecting cover and vent 128. This cover 128 is retained in position by an elastomeric outer ring 130 that snaps into an annular groove 132 formed around the top of the cap nut 118.

The cover 128 is provided with an appropriate aperture, of the one way type, so that the poppet valve 106 can vent to atmosphere.

It is to be pointed out that the upper tubular portion of the poppet valve 106 is a precise, but sliding fit in the stepped bore 126; and the seal member 114, under compression from the spring 112, provides an anti-leak sliding seal fitment.

The proportioned air outlet chamber

The upper cap unit 52, at a position above the proportioning piston 70, is provided with a recess 134 that opens into an outlet 136, from which proportioned air flows after passing through the load proportioning mechanism.

As previously mentioned, the upper surface of the proportioning piston 70 engages the bottom end of the poppet valve 106 and performs the functions of opening the poppet valve, and when a proper pressure balance is reached, the opening force is removed from the bottom end of the poppet valve, and spring 112 causes valve 106 to relap. This stops the flow of air across valve element 110 and opening 104.

The bottom end of the poppet valve 106 actually engages a pad element 85 of the rolling diaphragm 84. The pad element 85 is resilient or elastomeric and provides an air seal when abutted against the bottom end of the poppet valve 106.

Operation of the load proportioning mechanism

The load proportioning mechanism thus described, controls the amount of applied treadle air pressure (38 in FIGURES 1 and 2) reaching the brake chambers 20 of a monitored axle.

The treadle pressure in chamber 98 multiplied by the area of the control piston 68 creates a downward force on the control piston, and against balance arm 94. Similarly, the outlet proportioned air pressure in chamber 134, multiplied by the area of the proportioning piston 70, is a balancing force acting downwardly on the proportioning piston, and against balance arm 94.

As shown in FIGURE 4, the mechanism is at a steady state condition; and to maintain this condition, it is necessary for the force acting upon the control piston 68- diaphragm 76 assembly multiplied by the length $L_1$ (the distance between the axis of control piston 68 and apex 67 of movable fulcrum 66) of the balance arm 94, to equal the force acting on the proportioning piston 70-diaphragm 84 assembly, multiplied by length $L_2$ (the distance between the axis of proportioning piston 70 and the apex 67 of the balance arm. The relationships $L_1$ and $L_2$ are illustrated at the bottom of FIGURE 4 of the drawings.

This is set forth schematically as follows:

Pressure from treadle valve 38×control piston 68 diaphragm assembly area×length $L_1$ of the balance arm 94=pressure to relay valve 24×proportioning piston 70-diaphragm assembly area×length $L_2$ of the balance arm To obtain various pressure ratios the adjustable fulcrum 66 is moved causing a change in the values of $L_1$ and $L_2$.

Examples are as follows:

EXAMPLE 1

Length $L_1$=.75 in.
Control piston area=1 in.$^2$
Treadle pressure=40 p.s.i.
Length $L_2$=.75 in.
Prop. piston area=2 in.$^2$
Pressure to relay=20 p.s.i.

$$(40) \times (1) \times (.75) = (20) \times (2) \times (.75)$$
$$30 = 30$$

EXAMPLE 2

Changing the values of $L_1$ and $L_2$ gives a change in the pressure to the relay with the treadle pressure remaining constant.

Length $L_1$=1 in.
Control piston arm=1 in.$^2$
Treadle pressure=40 p.s.i.
Length $L_2$=.5 in.
Prop. piston area=2 in.$^2$
Pressure to relay=40 p.s.i.

When increased treadle pressure is introduced, the control piston 68 is pushed downwardly and the balance arm 94 rotates counterclockwise pushing the proportioning piston 70 and poppet valve 106 upwardly. The seal at the valve seat 110, 104 is broken, allowing compressed air from the treadle inlet chamber 98 to flow into passage 134 and outlet 136 until the mechanism forces balance one another, and the unit returns to the steady state condition as shown in FIGURE 4.

If the treadle pressure is reduced, the force balance is destroyed. The proportioning piston 70 is pushed downwardly and away from the lower end of the poppet valve 106, allowing air in the outlet proportioning chamber 134 and conduit system to which attached, to flow through the center of the poppet valve 106 and vent to atmosphere. This action continues until the forces on the pistons 68 and 70 regain balance and this causes the resealing of the poppet valve at the lower end against the diaphragm pad 85 of the proportioning piston 70, with the unit again assuming a steady state configuration.

The fulcrum control and dash pot mechanism

The lower half of FIGURE 4 shows in detail the control mechanism for the movable fulcrum 66, and the dash pot mechanism. The function of this mechanism is to change the location of the movable fulcrum 66 and to eliminate unwanted fulcrum motion.

The movable fulcrum 66 has a flange 138 as a base. The bottom surface 140 of the flange base 138 is flat. The top surface 142 of the lower cover unit 54 is also flat. The flat surfaces 140, 142 are slidable relative to one another with the application of an appropriate lubricant into the chamber surrounding the movable fulcrum 66. Therefore, the fulcrum 66 is slidable on the surface 142.

Orientation of the movable fulcrum unit 66 is provided by means of a cross pin-roller 144.

A rotatable, load-indicating input shaft 146 is journaled in the lower cover unit 54 in opposed spaced bores 148, FIGURE 3. Shaft 146 is locked to a connecting rod 150 that has an oval cross passage 152 at the upper end to receive the cross pin-roller unit 144, connected to the movable fulcrum 66.

The movable fulcrum 66 carries opposed bosses 154 that each contain half-sockets 156. Connecting rods 158 are provided with ball ends 160. One end of each connecting rod 158 is positioned in a half socket 156 of a boss 154 and held in place by means of a ball retainer 162.

The dash pot mechanism

In opposed alignment on each side of the bosses 154 of the movable fulcrum 66 are provided dash pot cylinders 164. These units are fabricated in the form of cap nuts having external threads 166 that are turned into opposed threaded apertures 168 formed in the central casting 50. The interiors of the dash pot cylinders 164 are developed as cylindrical bores 170 having flat sealed ends 172.

Piston assemblies 174 are mounted in the cylindrical bores 170 for reciprocation.

Each piston assembly 174 comprises an outer tubular shell with a transverse head 176. The pistons are thus hollow. A circular recess 178 is provided in the head 176 of each piston and spaced holes 180 extend from the bottom of each recess 178 through the piston heads 176.

Centrally, each head 176 is provided with a larger aperture 182 that accepts the stem 184 of a flat diaphragm of elastomeric material comprising a check valve 186.

The check valve 186 functions to release fluid from the bottom side of a piston 174 to the top side of the piston and into the space above the piston, on movement of the piston out of the bore 170. The diaphragm 186 of the check valve 186 is lifted by the moving fluid and thus the fluid is free to move or pass through the holes 180. However, on movement of the piston 174 into the bore 170, the diaphragm of check valve 186 is compressed into the cavity 178 in the head 176 of the piston. This absolutely stops fluid flow through the piston in this direction of movement of the piston.

The piston 174 is practically stopped dead. However, the clearance between the periphery of the piston 174 and the cylinder wall 170 permits a slow leakage around the piston.

The result is that the opposed pistons 174 hold the movable fulcrum 66 steady against quick movements of the input shaft 146. Thus, road roughness is damped out. However, a steady pressure on the input shaft 146 causes a slow leakage to take place past the pistons 174, and lets the piston system adjust and reposition the movable fulcrum 66 to reflect a shift in load or a load change.

Into the hollow cavity of each piston 174 is pressed a piston insert 188 having flow apertures 190 therein. The bottom side of each insert 188 is provided with a half socket 192, see the left side of FIGURE 4, to receive a ball end 160 of a connecting rod 158. Ball retainers 162 hold the ball ends 160 in place.

Function and operation of the dash pot mechanism

The function of this mechanism as has been pointed out above, is to permit the relocation of the movable fulcrum 66, to indicate a change in load or a shift in load relative to a monitored axle; but to eliminate unwanted fulcrum motion produced by road roughness or quick movements of a bouncing axle.

Torsional forces are fed to the input shaft 146 by an interconnecting sensing mechanism of one of two types that will be developed thoroughly hereinafter. The torsional forces indicate either a load change or a bump in the road. Attached mechanically to the input shaft is the shift lever 150.

The upper end of the shift lever 150 by means of the oval passage 152, embraces the pin-roller 144 of fulcrum 66, permitting the shift lever to move. The pin 144-slot 152 connection allows the rotational motion of the shift lever 150 to be translated into linear motion of the movable fulcrum 66. When the shift lever 150 is rotated, indicating a load change, the fulcrum 66 is moved a certain distance, changing the pressure ratio given by the load proportioning mechanism housed in the top part of the unit.

To eliminate unnecessary shifting of the adjustable fulcrum 66, as when the monitored axle hits a bump, the dash pot piston-cylinder assemblies 174, 170 slow down the time required for shifting. Thus any rotational movement of shift lever 150 not only provides pressure on the pin 144 tending to move the fulcrum 66, but also exerts pressure against a piston 174 through the connecting rods 158. A force applied to a piston 174 immediately causes its check valve 186 to close and builds a pressure head in the fluid trapped above the piston, thereby stopping movement of the piston.

This pressure head is allowed to decay by permitting the trapped fluid to escape through a clearance between the piston and the cylindrical bore 170.

From the foregoing it will be understood that rapidly applied inputs (bumps) will not cause a change in the movable fulcrum 66; but, a steady input of extended duration, indicating a load change will cause the pressure head to decay and permit repositioning of the fulcrum 66.

In view of the foregoing description of the function of the load proportioning valve, the fulcrum control, and the dash pot mechanism, the two embodiments of load-change sensing devices will now be described in detail. These elements take the form of a mechanical unit with a lost motion mechanism; and a fluid sensing unit, also providing a lost motion mechanism.

Figures 5, 6:
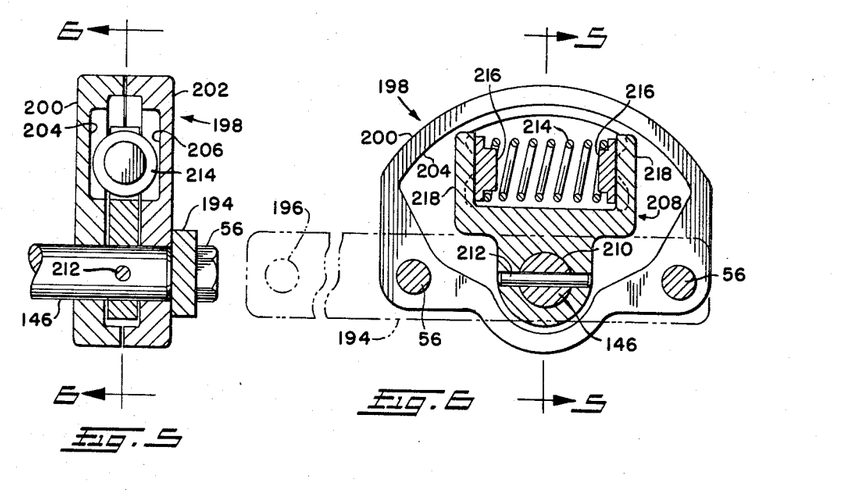
FIGURE 5 is a vertical sectional view through a mechanical lost motion assembly, as applied to the exposed output shaft of the unit of FIGURES 3 and 4, and as taken along the line 5—5 of FIGURE 6.
FIGURE 6 is a sectional view taken along the line 6—6 of FIGURE 5.
Figure 7:
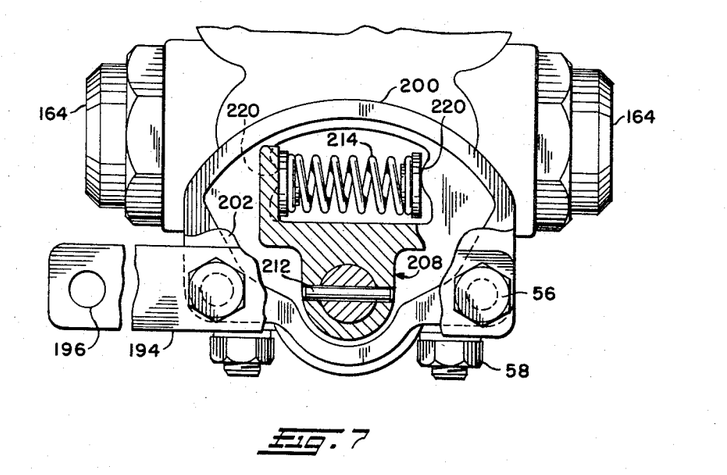
FIGURE 7 is a side elevational view, partly broken away, and partly in section, the section taken as along the line 6—6 of FIGURE 5, better showing the cam surfaces of the lost motion housing and their interrelationship with the input fork attached to the input shaft of the basic unit.

The mechanical linkage indicating vehicle loading: mechanical lost motion arm In FIGURES 5, 6 and 7, the input shaft 146 is that belonging to the fulcrum control mechanism as shown and previously described relative to FIGURES 3 and 4.

The indicator arm 194 is connected to a monitored axle by means of an aperture 196 at the free end. Freedom of movement at the axle connection is suitably provided by a bushed bolt passed through the aperture 196.

A mechanical dash pot mechanism 198 is provided at the other end of indicator arm 194. As shown in FIGURE 5, this dash pot mechanism 198 comprises two mirror image half shells 200 and 202. The shells 200 and 202 are fastened together and to the indicator arm 194 by means of bolts 56 passed through suitable holes provided in the various units.

The shells 200 and 202 each contain mirror image stepped cavities 204 and 206.

At the narrower, bottom portion of the cavities 204 and 206, an input fork 208 is applied in movable relation relative to the side walls of the cavities. The input fork 208 is provided with an aperture 210 at the bottom to receive the input shaft 146. A cross pin 212 locks the fork 208 and the shaft 146 together.

The upper, centrally enlarged portions of the cavities 204, 206 receive a compression spring 214, having caps 216 at each end. The spring 214 along with its caps 216 is received between the prongs 218 of the fork 208.

Embracing the prongs 218 of fork 208 are cam surfaces 220, best shown in FIGURE 7, that form the end walls of the enlarged upper portions of cavities 204 and 206.

Operation of the mechanical lost motion arm

The indicator arm 194 is attached to the monitored axle through an appropriate linkage, while the load-proportioning valve of FIGURE 4 is attached to the frame of the vehicle. The indicator arm 194, housing halves 200 and 202, and cam surfaces 220 are in effect integral, and act as one part with no relative motion between the parts. The mechanical dash pot mechanism or housing 198 is free to rotate on the input shaft 146, while the input fork 208 is pinned to the shaft.

The compression spring 214 is pre-loaded and the end caps 216 are in contact with both prongs 218 of the input fork 208, as well as the two cam surfaces 220, FIGURE 7, when the unit is in a steady state condition as shown in FIGURES 6 and 7.

The indicator arm 194, when rotated, causes one of the cam surfaces 220 to deflect the compression spring 214; and at the same time the opposing cam surface moves away from the compression spring, leaving it captured between one cam and one prong 218 of the input fork 208. The force thus developed in the spring 214 bears totally on the one prong 218 of fork 208, moving that arm to match the location of the corresponding cam surface 220.

Thus when a bump in the road is sensed by the indicator arm 194, a resilient bias only is impressed upon the input shaft 146. This is absorbed by the dash pot mechanism of the load proportioning valve of FIGURE 4 and is effectively damped out.

However, a shift of loading relative to the monitored axle or a change in load by addition or removal, will impose a steady bias on the input fork 208 of FIGURE 6 until the dash pot mechanism of the valve of FIGURE 4 permits leakage past one of the cylinders 174 to establish a readjusted position of the movable fulcrum 66.

*The air sensing device*

Figure 8:
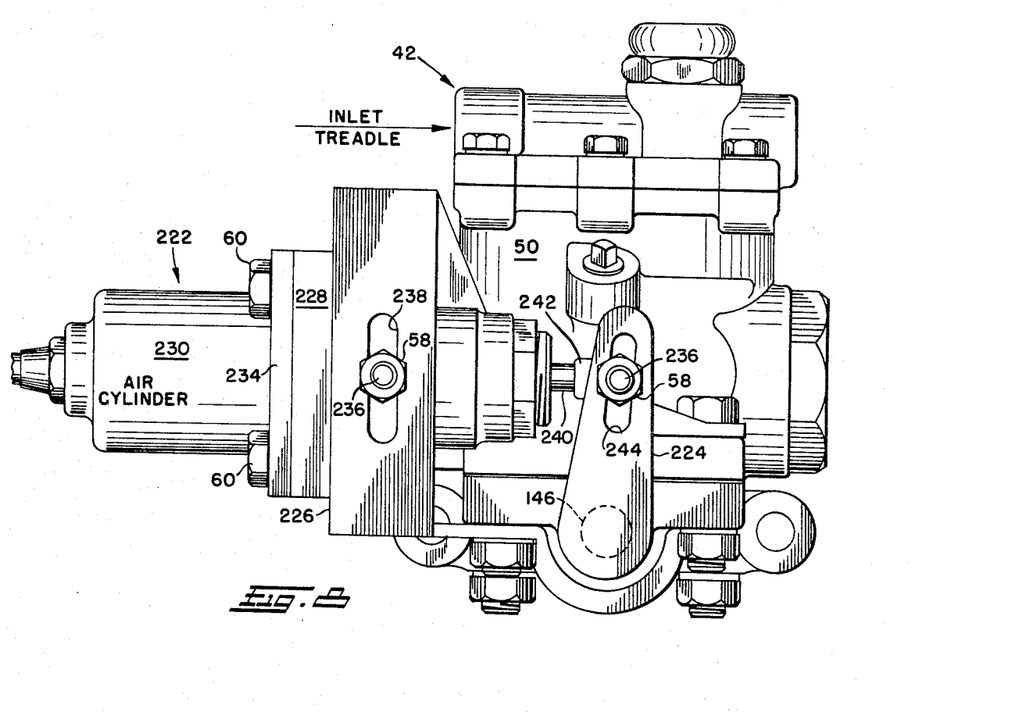
FIGURE 8 is a side elevational view showing the basic unit of FIGURES 3 and 4, having an air sensing mechanism attached for operability with an air-bag spring suspension.

The automatic load-proportioning valve 42 of the present invention is shown in FIGURE 8 with an air sensing device 222 operably connected to it. A connecting arm 224 is attached by means of an appropriate socket end, not shown, to the input shaft 146.

A support bracket 226 is fastened to the central casting 50 by suitable bolts, hidden. An annular yoke 228, carried by the bracket 226 receives air sensing device 222. An annular flange 232, FIGURE 9, of the air sensing device 222 abuts a shoulder, not shown, in annular yoke 228 to provide a home position. An annular cap 234 is secured in place by means of bolts 60 and holds the air sensing device 222 in position.

The annular yoke 228 is provided with opposed pivot rods 236. The rods 236 are journaled at their inner ends in the annular yoke 228, and the outer ends are reduced and threaded as indicated, and held in place in elongated slots 238 of bracket 226 by nuts 58. The air sensing device 222 is thus free to pivot about the pivot point or rod 236.

The air sensing device 222 includes a push rod 240. A pivot cap 242 also has a bushed pivot rod 236 extending transversely through an elongated slot 244 of connecting arm 224. A nut 58 is tightened on the threaded end of the pivot rod 236 and locks the pivot cap unit 242 at a selected position in the slot 244.

*The details of the sensing device*

Figure 9:
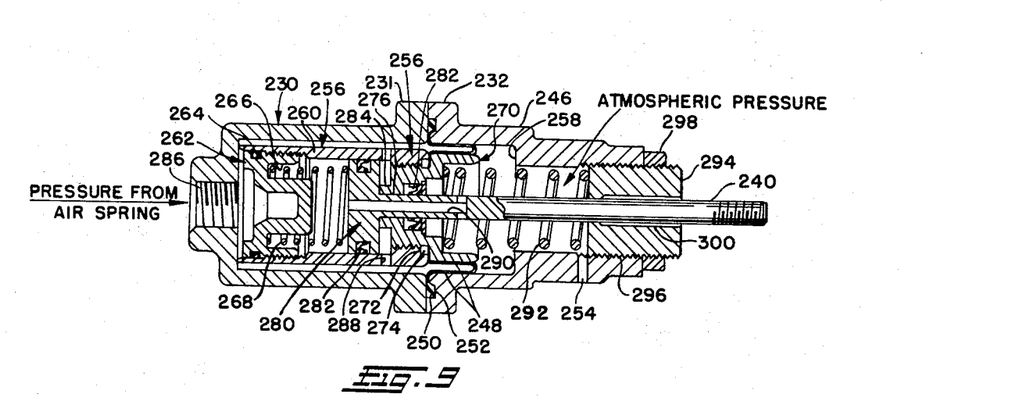
FIGURE 9 is an axial sectional view of the air sensing device and control mechanism of FIGURE 8.

The details of the sensing device 222 are shown in the axial sectional view of FIGURE 9.

This unit 222 not only is capable of controlling the setting of the movable fulcrum 66 of the basic unit 42 of FIGURES 3 and 4, but also provides a lost motion mechanism, by the fact that quick compression from an air bag spring can take place while movement of the internal parts of the unit is retarded.

For ease of service, the sensing device 222 comprises a front cylinder portion 230 having a flange 231 at the rear end; and a real cylinder portion 246 carrying the flange 232 at the front end. The flanges 231 and 232 are abutted and are retained together under pressure, as in FIGURE 8, by bolts 60, the annular yoke 228 and annular cap 234. The front cylinder portion 230 operates under air bag spring pressure and the rear cylinder portion 246 operates at atmospheric pressure. A rolling diaphragm 248 is clamped between the front and rear portions 230, 246.

The diaphragm 248 includes a circular edge ring 250 that is received in an annular groove 252. This forms a gastight barrier between the cylinder portions 230 and 246.

The cylinder portion 246 is vented to atmosphere by means of a port 254 through the wall.

*The positioning piston*

A positioning piston 256 operates between the inlet end of the cylinder portion 230 and an annular shoulder 258 formed in cylinder 246.

The positioning piston 256 has a tubular side wall 260 that is closed at each end. At the left hand end, a failsafe stop plug 262 is inserted and held in position by mating threads on the interior of the piston 256 and exterior of the stop plug respectively. O-ring seal means is employed as indicated at 264. The fail-safe plug 262 contains an annular recess 266 which receives one end of a fail-safe piston return spring 268.

At the other end, the piston wall 260 is closed by an annular diaphragm retainer and seal unit 270. This unit is held in place by mating threads on the interior of the piston 256 and the exterior of the annular retainer 270. An inner ring edge 274 of the diaphragm 248 is held in place in an annular groove 272 formed in the end of the positioning piston 256, by the annular retainer 270.

The annular retainer 270 has an internal bore 276 that slidably receives the stem 240 of a fail-shafe piston 280. A sliding seal 282 is provided around the push rod 240. The left hand end of retainer 270 is formed as a tubular projection 284, that functions as a stop for the fail-safe piston 280.

The fail-shafe piston 280 has a sliding seal 282 between the periphery and the smooth internal bore of the positioning piston 256.

At this point it should be noted that the fail-safe piston return spring 268 normally biases the fail-safe piston 280 to the right. In operation, bias of spring 268 is counteracted by compressed air flowing in through an inlet 286 that passes around the positioning piston 256 and through a port 288 formed in the piston wall 260 in alignment with the tubular projection 284 that functions as a stop to keep the fail-safe piston 280 an appropriate distance off the bottom of the cylinder in which it operates.

*Atmospheric venting of the fail-safe piston*

An axial bore 290 is provided through the fail-safe piston 280 and down the push rod 240 to a point beyond the annular diaphragm retainer 270 and its seal 282. This permits the chamber above the fail-shafe piston 280 to breath freely so that the pressure on the bottom side of the fail-safe piston is free to move that piston against the bias of the return spring 268. As previously mentioned, the chamber to the right of the diaphragm retainer 270 and of the diaphragm 248 is vented to atmosphere through port 254.

*Return spring and adjustment*

An annular plug member 294 is externally threaded and turned into a threaded section 296 at the right hand end of the rear cylinder section 246. A threaded lock ring 298 is effective to set and hold the plug 294 in an adjusted position.

The plug 294 is bored at 300 to slidably receive and center the push rod 240.

The return spring 292 for the positioning piston 256 is retained between the plug 294 and the bottom of a recess in the diaphragm retainer and seal member 270.

From the foregoing it will be observed that the return spring 292 functions to move the positioning piston 256 back against the left end of the cylinder half 230. Within the positioning piston 256, there is slidably carried a failsafe piston 280 that is biased toward a stop position 284 by the spring 268; and the fail-safe piston carries the actuating stem or push rod 240 with it.

Operation of the sensing device 222

The sensing device shown in FIGURE 9 is designed to allow the pressure present in an air bag spring to position the movable fulcrum 66 of the basic unit of FIGURE 4. The pressure in an air bag spring at each axle is proportional to the loading of that axle.

This pressure is introduced into the unit of FIGURE 9 through the inlet 286.

As shown in FIGURE 9, the components of the sensing device 222 are in a fail-safe position of no pressure in an air spring, that is no pressure in inlet 286. Thus, the fail-safe piston return spring 268 has pushed the fail-safe piston 280 to the right to a bottom position. At this condition, the components are set so that the movable fulcrum 66 of FIGURE 4 is in a position to give a 1 to 1 pressure ratio in the proportioning unit, that is a 1 to 1 ratio between control piston 68 and the proportioning piston 70 of FIGURE 4.

With an increase in the air bag pressure from 0 to a minimum no-load pressure, say 5 p.s.i., the fail-safe piston 280 is forced to the left to rest against the fail-safe stop plug 262. The pre-load in the large return spring 292 prevents the positioning piston 256 from moving. The proportioning unit will now be at a greater pressure ratio position, of about 3 to 1. Thus the movable fulcrum 66 has been moved sharply to the left in FIGURE 4.

Increasing the pressure from about 5 p.s.i., a low order of fail-safe pressure, to maximum in the air bag spring will cause the positioning piston 256 to be moved to the right and bottom on the shoulder 258. This movement of the positioning piston of course is effective to carry the fail-safe piston 280 with it and extend the push rod 240 out to the right.

The positioning piston 256 will continue to travel to the right with an air bag pressure increase until, at full axle load pressure, it comes to rest against the stop shoulder 258 at which time the proportioning unit will be at a 1 to 1 pressure ratio position again.

When the air spring pressure falls off towards zero, the reverse of the above takes place with the springs 292 and 268 returning the pistons 256 and 280 respectively, to the static position of FIGURE 9.

Explaining the above in terms of proportioning brake pressure to loading of a monitored axle, it is to be understood that a 1 to 1 ratio is the setting for a fully loaded axle wherein full brake pressure must be provided at the wheel of the monitored axle. Air pressures less than maximum will permit the positioning piston 256 of FIGURE 9 to move off the stop 258, to the left, and accordingly reduce the air pressure going to the monitored axle. With pressures less than maximum in an air bag spring, the positioning piston 256 will be in a floating condition between the stop 258 and the left hand end of the air cylinder segment 230. Any sudden bumps produced by road roughness will cause the air pressure to the left of the positioning piston to increase momentarily but the dash pot system in the main proportioning unit will absorb this shock and prevent any deflection of the movable fulcrum 66.

Of course, when the air bag pressure is at a maximum and the positioning piston is at the stop 258, fluctuations in pressure are absorbed by the stop, and accordingly, there is no deflecting pressure imposed against the movable fulcrum 66.

From the foregoing it will therefore be understood that lost motion mechanism is inherent by the compressability of the gas in the air bag system.

Summary and advantages of the present invention

The present description has set forth a novel pressure-proportioning valve mechanism and integrated sensing system for use in the pneumatic brake actuation art. The proportioning valve is of novel construction and provides a substantial advancement to the art by the fact that the diaphragm-sealed, pressure-responsive pistons employed therein produce extremely low hysteresis characteristics, giving a very rapid reaction response. Also a damped fulcrum positioning mechanism is embodied in the valve insuring long service life for the pressure-responsive pistons.

To supplement the main pressure-proportioning valve, two types of sensing devices are provided in order to monitor to it the instant loading of both mechanically and pneumatically sprung axles. The sensing devices are interchangeable with the main unit. Thus a high degree of flexibility of application is provided, with maximum economy in manufacture.

The word fluid as used herein is to be understood as including both gases and liquids. The invention has been specifically described relative to air brakes as used on vehicles such as trucks or buses. However, the principles apply as well to brakes wherein the pressurized fluid is a liquid.

What is claimed is:
1. In a pressure proportioning valve,
a housing,
first and second cylinders in said housing each having pressure responsive pistons movable therein,
said pistons each having a top and a bottom,
seal means between the tops of said pistons and said cylinders,
a lever arm within said housing beneath said pistons and extending between said pistons,
means connecting spaced points on said lever arm to the bottoms of said pistons,
a fulcrum within said housing engaging said lever arm and being supported for adjustment between said spaced points,
means for moving said fulcrum,
first chamber means above said first piston,
second chamber means above said second piston,
passage means extending between said first and second chamber means,
and supply and exhaust valve means controlling the flow of fluid through said passage means,
said supply and exhaust valve means comprising a tubular stem carrying an annular valve member,
said tubular stem providing an exhaust passage and being adapted to seat against said seal means.
2. In a pressure proportioning valve,
a housing,
first and second movable pressure responsive pistons in said housing,
each piston having a top and a bottom and the second piston having a larger diameter than the first piston,
sealing means at the top of each of said pistons,
lever arm means within said housing and extending between said pistons,
means connecting spaced points of said lever arm means to the bottom of said pistons,
a movable fulcrum within said housing and engaged with said lever arm means between said spaced points,
a flat surface in said housing slidably supporting said fulcrum,
means for moving said fulcrum,
first chamber means exposed to the top of said first piston,
second chamber means exposed to the top of said second piston,
passage means extending between said first and second chamber means,
and supply and exhaust valve means in said passage means,
said supply and exhaust means including a tubular stem carrying an annular valve member,
said tubular stem providing an exhaust passage and being adapted to seat against said sealing means at the top of one of said pistons.

3. In a pressure proportioning valve, a housing, first and second movable pressure responsive pistons in said housing, each piston having a top and a bottom and the second piston having a larger diameter than the first piston, sealing means at the top of each of said pistons, lever arm means within said housing and extending between said pistons, means connecting spaced points of said lever arm means to the bottoms of said pistons, a movable fulcrum within said housing and engaged with said lever arm means between said spaced points, a flat surface in said housing slidably supporting said fulcrum, said movable fulcrum having a cavity opening towards said flat surface, an input shaft journaled in said housing, an arm fixed at one end of said input shaft and operably connected at the other end in said cavity of said fulcrum to slide said fulcrum on said flat surface on rotation of said shaft, first chamber means exposed to the top of said first piston, second chamber exposed to the top of said second piston, passage means extending between said first and second chamber means, and supply and exhaust valve means in said passage means, means normally biasing said supply and exhaust valve means toward the closed position, said supply and exhaust valve means being engageable by the top of said second piston to close the exhaust valve means and open the supply valve means against said biasing means.

4. In a pressure proportioning valve, a housing, first and second movable pressure responsive pistons in said housing, each piston having a top and a bottom, sealing means at the top of each of said pistons, lever arm means within said housing and extending between said pistons, means pivotally connecting spaced points of said lever arm means to the bottoms of said pistons, a movable fulcrum within said housing and engaged with said lever arm means between said spaced points, a flat surface in said housing slidably supporting said fulcrum, means for moving said fulcrum, a pair of dash dots connected to opposite sides of said fulcrum, first chamber means exposed to the top of said first piston, second chamber exposed to the top of said second piston, passage means extending between said first and second chamber means, supply and exhaust valve means controlling the flow of fluid through said passage means, said supply and exhaust means including a hollow stem carrying an annular valve member, said hollow stem providing an exhaust passage and being adapted to seat against said sealing means at the top of one of said pistons.

5. In a valve system for proportioning brake effort to the loading of a monitored axle of a vehicle, a housing, first and second cylinders in said housing having movable pressure responsive pistons therein, sealing means carried by each of said pistons, lever means engaging said pistons at spaced points, a movable fulcrum engaging said lever means to establish variable lever arms relative to each of said pistons, supply and exhaust valve means controlling the flow of fluid between said cylinders, said supply and exhaust valve means including a tubular stem carrying an annular valve member, said tubular stem providing an exhaust passage and being adapted to seat against said sealing means carried by one of said pistons, an actuator member connected to said fulcrum and adapted to move said fulcrum, sensing means connected to said monitored axle and to said actuator member, and lost motion means interposed between said sensing means and said actuator member.

6. In a valve system for proportioning brake effort to the loading of a monitored axle of a vehicle, a housing, first and second cylinders in said housing having movable pressure responsive pistons therein, sealing means carried by each of said pistons, lever means engaging said pistons at spaced points, a movable fulcrum engaging said lever means to establish variable lever arms relative to each of said pistons, supply and exhaust valve means controlling the flow of fluid between said cylinders, said supply and exhaust valve means including a tubular stem carrying an annular valve member, said tubular stem providing an exhaust passage and being adapted to seat against said sealing means carried by one of said pistons, an actuator member connected to said fulcrum and adapted to move said fulcrum, dash pot means connected to said fulcrum and adapted to hold said fulcrum relative fixed against intermittent forces imposed on said actuator member and permitting said fulcrum to move under sustained forces imposed on said actuator member, sensing means connected to said monitored axle and to said actuator member, and lost motion means interposed between said sensing means and said actuator member.

7. In a valve system for proportioning brake effort to the loading of a monitored axle of a vehicle, a housing, first and second cylinders in said housing each having a movable pressure responsive piston therein, sealing means between the pistons and cylinders and providing rolling seal therebetween, lever means engaging said pistons at spaced points, a movable fulcrum engaging said lever means to establish variable lever arms relative to each of said pistons, supply and exhaust valve means controlling the flow of fluid between said cylinders, said supply and exhaust valve means including a tubular stem carrying an annular valve member, said tubular stem providing an exhaust passage and being adapted to seat against said sealing means, an actuator member connected to said fulcrum and adapted to move said fulcrum, dash pot means connected to said fulcrum and adapted to hold said fulcrum relatively fixed against intermittent forces imposed on said actuator member and permitting said fulcrum to move under sustained forces imposed on said actuator member, sensing means connected to said monitored axle and to said actuator member, and lost motion means interposed between said sensing means and said actuator member, said lost motion means including a second housing journaled on said actuator member and defining a cavity,
an input fork disposed in said cavity and having a body portion fixed on said actuator member,
said input fork having opposed spaced prongs,
a compression member extending between said prongs,
abutment means carried by said second housing within said cavity and engageable with each end of said compression member whereby movement of said second housing is effective to cause said abutment means to move one end of said compression member away from one of said prongs and impose the force exerted by said compression member against the other prong.

References Cited

UNITED STATES PATENTS

| | | | |
|---|---|---|---|
| 1,720,268 | 7/1929 | Farmer | 303—22 |
| 2,092,245 | 9/1937 | Farmer | 303—22 |
| 2,110,704 | 3/1938 | Farmer | 303—22 |
| 2,657,774 | 11/1953 | Perrot | 303—22 |
| 2,987,346 | 6/1961 | Wrigley | 303—22 XR |

FOREIGN PATENTS 943,504  12/1953  Great Britain.

EUGENE G. BOTZ, *Primary Examiner.*